(12) United States Patent
Basson et al.

(10) Patent No.: US 9,311,461 B2
(45) Date of Patent: Apr. 12, 2016

(54) SECURITY SYSTEM BASED ON QUESTIONS THAT DO NOT PUBLICLY IDENTIFY THE SPEAKER

(75) Inventors: Sara H. Basson, White Plains, NY (US); Dimitri Kanevsky, Ossining, NY (US); Edward E. Kelley, Wappingers Falls, NY (US); Bhuvana Ramabhadran, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 1778 days.

(21) Appl. No.: 12/103,892

(22) Filed: Apr. 16, 2008

(65) Prior Publication Data

US 2009/0265770 A1    Oct. 22, 2009

(51) Int. Cl.
*G06F 21/31* (2013.01)
*H04L 29/06* (2006.01)
*H04L 9/32* (2006.01)

(52) U.S. Cl.
CPC ........ *G06F 21/31* (2013.01); *G06F 2221/2103* (2013.01); *H04L 9/32* (2013.01); *H04L 63/08* (2013.01); *H04L 63/083* (2013.01)

(58) Field of Classification Search
CPC ......... H04L 9/32; H04L 63/08; H04L 63/083; G06F 21/31
USPC .............................. 726/7, 17, 21, 29; 713/182
See application file for complete search history.

(56) References Cited

U.S. PATENT DOCUMENTS

| 5,774,525 | A  | * | 6/1998 | Kanevsky et al. ......... 379/88.02 |
| 6,519,699 | B2 | * | 2/2003 | Lu et al. ........................ 713/182 |
| 7,039,951 | B1 |   | 5/2006 | Chaudhari et al. |
| 7,231,657 | B2 | * | 6/2007 | Honarvar et al. ................. 726/2 |
| 2004/0095384 | A1 | * | 5/2004 | Avni et al. ..................... 345/745 |
| 2005/0131695 | A1 | * | 6/2005 | Lucente et al. ............... 704/257 |
| 2005/0216768 | A1 | * | 9/2005 | Eppert ......................... 713/201 |
| 2006/0047605 | A1 |   | 3/2006 | Ahmad |
| 2006/0212931 | A1 |   | 9/2006 | Shull et al. |
| 2006/0248099 | A1 | * | 11/2006 | Barrett et al. ................. 707/100 |
| 2006/0288225 | A1 | * | 12/2006 | Jung et al. ..................... 713/182 |
| 2006/0294390 | A1 | * | 12/2006 | Navratil et al. ............... 713/182 |
| 2007/0214354 | A1 | * | 9/2007 | Renaud ......................... 713/155 |
| 2008/0222706 | A1 | * | 9/2008 | Renaud et al. .................... 726/4 |
| 2008/0222722 | A1 | * | 9/2008 | Navratil et al. ................. 726/21 |

\* cited by examiner

*Primary Examiner* — Chau Le
*Assistant Examiner* — Gary Lavelle
(74) *Attorney, Agent, or Firm* — John A. Jordan

(57) ABSTRACT

A method and system for authenticating a user seeking access to a secured system in a public area. Access is granted when a user demonstrates sufficient knowledge of the user's personal characteristics stored in the system. The user initiates the access process by tapping into the stored characteristics without overtly stating information that may be overheard. The user statements reflect an awareness about the categories of user uniqueness without divulging details. The system response statements act to elicit further information from the user for response and the response statements are scored. After a cumulative score threshold is met, the user is granted access.

4 Claims, 6 Drawing Sheets

SECURITY SYSTEM BASED ON QUESTIONS THAT DO NOT PUBLICLY IDENTIFY THE SPEAKER

BACKGROUND OF THE INVENTION

1. Field of the Invention

The present invention relates generally to a security system and method for providing user authentication and, more particularly, to a security system and method for ensuring user identity in accessing user accounts in said system.

2. Background and Related Art

There are a variety of techniques used to establish the identity of a user in accessing secure information stored in large server systems. With the computing world evolving towards an era where large numbers of users need to communicate with these large server systems, user environment and convenience dictate the necessity for a variety of modes of user access to user accounts, for example. One common and convenient mode of user access is through voice or audio access. Another common and convenient mode of access is through a keyboard, or touch pad associated with a computer or phone system.

Regardless of the mode of access, it is clear that it is critical before allowing user access to confidential information available on servers that there is an effective way to efficiently verify the identity claim of a user attempting to gain access. The ability to effectively verify identity becomes increasingly difficult where access is required in public areas, i.e. areas where others that should not be privy to the identity information provided to gain access may become privy by their presence.

For example, where users need to verbally self-identify over a telephone, the verbal information provided for self-identity may be easily overheard and readily re-used by an impersonator. Similarly, use of a keyboard for self-identity may be observed although not as readily. Typically required information, such as, user account number, social security number, date of birth and mother's maiden name are therefore prone to risk when provided in an open environment.

Accordingly, there is need for a method and system apparatus that allows a user to effectively gain access, while in public areas, to secure information servers without the risk of others obtaining the identity information used to gain access to the servers.

SUMMARY OF THE PRESENT INVENTION

The present invention is directed to methods, software and system apparatus for allowing user access to a user account, for example, in a secure information server environment using self-identity information that would not be useful to others who might obtain same. In accordance with the present invention, unique personal characteristic identifiers or signifiers about the user are stored in the server system and do not need to be disclosed over the system. The methods, software and system apparatus act to allow the user to tap into this unique personal information by ambiguous or obscure oral statements, for example, without overtly providing critical information that can be overheard or otherwise obtained by others.

In this regard, the user effectively demonstrates to the system that the user is knowledgeable about the personal characteristics stored in the system that make the user unique, without identifying those characteristics publicly. This can be achieved by presenting to the system general statements that are deliberately ambiguous or obscure statements that reflect awareness about the stored categories of uniqueness, without divulging details. The user is given the task of initiating this process. It is to be understood, that it is more effective for the user to generate queries or statements of fact about personal information stored in the system database with the system checking the facts, versus setting up the system as the generator of a large set of relevant queries. The personal information stored in the system comprises classes of information, such as, physical characteristics, educational background, places lived, etc. Thus, the terms "user characteristics", "user personal characteristics", "personal characteristics information" or similar such terms, for example, are all intended to mean any information that may be personal and unique to the user other than common personal identification information, such as, name, address, serial numbers, telephone number, password, etc.

In accordance with the present invention, there is thus not an exchange of the commonly employed identifying information between the user and server system being accessed but rather an evaluation of the user's knowledge of the unique characteristics of the user stored in the data base of the system. Accordingly, user characteristic identifying information stored in the server data base acts as a basis for creating a variety of system commands or questions for eliciting further unique information identifying the user, after the user initiates the dialog by tapping into the unique characteristics. The user's response to these commands or questions is, in turn, analyzed by the system to evaluate same and create a score. Successive commands or questions (statements) may be provided to the user for user response, and user response evaluation and scoring by the system. A user entry scoring threshold may be required to be met for ultimate user authentication for system access. Such incremental authentication for controlling access to a secured system may be used to provide various levels of security. As used herein, the term "statements" is intended to mean either commands or questions, as the case may be, whether oral or electronic.

In one aspect of the present invention, a method for authenticating a user for allowing access to a system comprises the steps of: receiving user personal characteristics information statements from a user; generating a system response statement for each personal characteristics information statement received from said user based upon stored personal characteristic information in said system related to said user personal characteristics information; sending said system response statements to said user in response to each personal characteristics information statement sent by the user; evaluating user personal characteristics information response statements to said system response statements relative to stored personal characteristics of said user in said system; and granting access to said system when evaluation of said user personal characteristics information response statements are cumulatively sufficient to said uniquely identify the user.

In another aspect, the user personal characteristics information response statements are used to identify a related user personal characteristic stored in said system and said related user personal characteristic stored in said system is compared to the same global characteristic stored in said system to determine whether said related used characteristic is unique.

In yet another aspect of the present invention, a general or global system response statement for each unique characteristic is generated and sent to the user for response by the user and the user response is evaluated.

In further aspect of the present invention, the evaluated user response is assigned a value based upon the extent to which the information contained in said response demonstrates knowledge of the stored personal characteristics of the user.

In yet a further aspect of the present invention, a software program is provided for receiving statements from a user having information content that demonstrates knowledge of the personal characteristics of the user stored in said system; then generating system response statements eliciting further statements from the user demonstrating the users' knowledge of the personal characteristics information of the user stored in said system; and sending said system response statements to said user for user response statements; comparing the information content of said user response statements to the unique information of the personal characteristics of said user stored in said system; and then granting access to said system when said step of comparing said information content of the user statements relative to the stored information of the personal characteristics of said user in said system indicate sufficient knowledge by the user to authenticate the user.

In still yet a further aspect of the present invention, a method is provided for authenticating a user to allow access to a system by testing the user's knowledge of unique personal characteristic information of the user by: storing unique personal characteristics information for each user; a user then accessing said unique stored personal characteristics information by obscure user statements that lead to said unique stored personal characteristics information; and successively responding to said user statements that demonstrate some knowledge by the user of said unique stored personal characteristic information by system statements eliciting further information from the user to test the user's knowledge of the unique personal characteristics; and then authenticating a user after the user demonstrates the level of knowledge required for access to the system.

It is also an aspect of the present invention to provide a computer system for controlling user access to secured data comprising: storage apparatus including an access control date base having information stored therein as to unique personal characteristics of said user; a communication port for receiving personal characteristics information statements from said user and sending system statements to the user in response thereto; a processor for controlling communication between said user and said system, said processor generating said system statements eliciting personal characteristics statements from said user in response to statements from said user and comparing the information contained in said personal characteristics statements received from said user to the said information as to unique personal characteristics of said user stored in said data base to determine if information received from said user is unique, said processor further analyzing the said information from said user to identify uniqueness of the personal characteristics of the user and whether the information indicates sufficient knowledge of the personal characteristics of the user to grant access to secured data information.

DETAILED DESCRIPTION OF THE DRAWINGS

It is to be understood that the exemplary system modules and method steps described herein may be implemented in various forms of hardware, software, firmware, special purpose processors, or a combination thereof. Preferably, the present invention is implemented in software as an application program tangibly embodied on one or more program storage devices. The application program may be executed by any machine, device or platform comprising suitable architecture. It is to be further understood that, because some of the constituent system modules and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Figure 1:
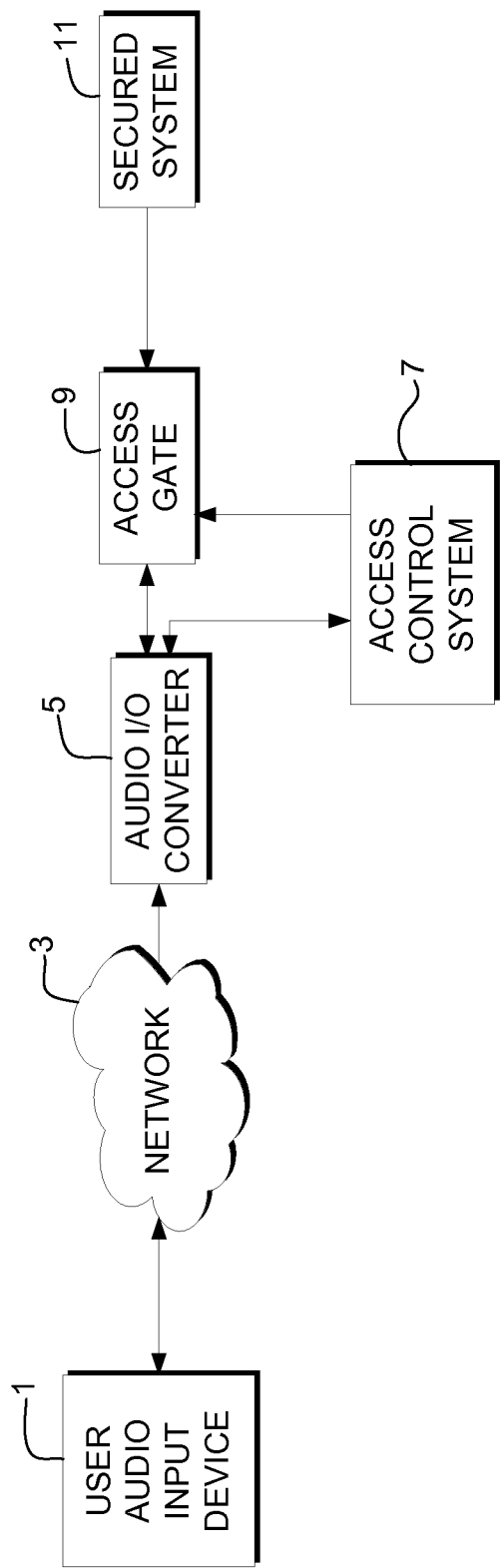
FIG. 1 is a block diagram depicting a security system, in accordance with an implementation of the present invention.

Referring to FIG. 1, the block diagram depicts the overall interactive system with access control, in accordance with the present invention. User input device 1 is shown as an audio input device, such as, a wireless or landline phone. However, it is clear that access control, in accordance with the principles of the present invention, would apply as well to keyboard or touch pad entry, such as may be embodied in a laptop computer or kiosk.

The audio I/O converter 5 includes apparatus for converting input user speech to digital signals and digital signals to audio output, as is well known in the art. Thus, converter 5 may include, for example, some form of an acoustic front end processor for capturing and processing input speech and some form of audio playback processor for synthesizing speech responses to the user.

The audio input of the user is transmitted over network 3 to audio I/O converter 5 where the speech is converted to digital signals that are sent to access control system 7. Access control system 7 interacts with the user in a manner so as to elicit information from the user as to the user's personal characteristics stored in the system, as will be further explained with respect to FIG. 2. When access control system 7 determines that the user has demonstrated sufficient knowledge of the user's personal stored characteristics, access is granted by opening access gate 9 to allow the user to communicate with secured system 11.

Figure 2:
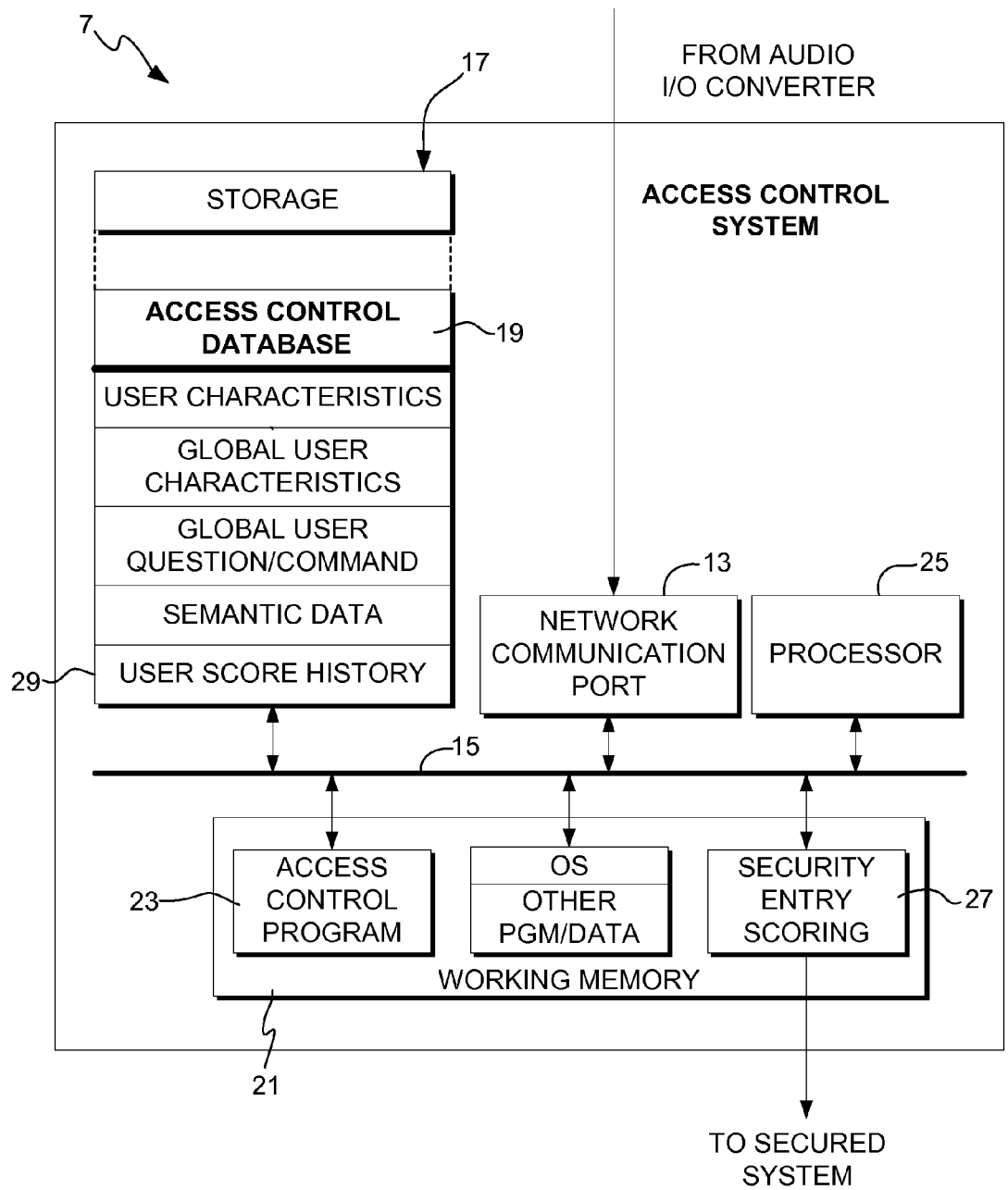
FIG. 2 illustrates a system for implementing access control, according to one implementation of the invention.

FIG. 2 shows a block diagram depicting access control system 7, as shown in FIG. 1, in accordance with one embodiment of the present invention. It is clear that other embodiments using the concept of user self-identity through ambiguous oral statements that demonstrate the user's knowledge of user personal characteristics may be readily implemented.

As shown in FIG. 2, digital signals representing user statements from audio I/O converter 5 are transmitted through network communication port 13 to system bus 15. The network communications port typically includes a modem or network card (wireless or wired). It is to be understood, that interactive statements between the user and system may be question statements or command statements related to the user's personal characteristics stored in storage device 17.

Storage device 17 may comprise any of a variety of storage devices, such as, disk drives, optical storage devices, solid state storage devices, and the like. Such devices may also be remote from the system. The storage device 17 includes an access control database, which database includes the databases for user characteristics, global user characteristics, global user question/command, semantic data and history of user score.

When a user initiates access, the user files of the identified user may be transferred from storage device 17 to working memory 21, along with operating system OS and access control program 23. Processor 25 acts to carry out the processes of access control program 23 using the identified user files in working memory 21. When a score is reached in security entry scoring module 27 that demonstrates sufficient knowledge on the part of the user as to the user's personal characteristics stored in the user files, this current score is compared to any stored score history 29 in the user file and, if consistent, a message is sent to open access gate 9, shown in FIG. 1, to allow user access.

Figure 3:
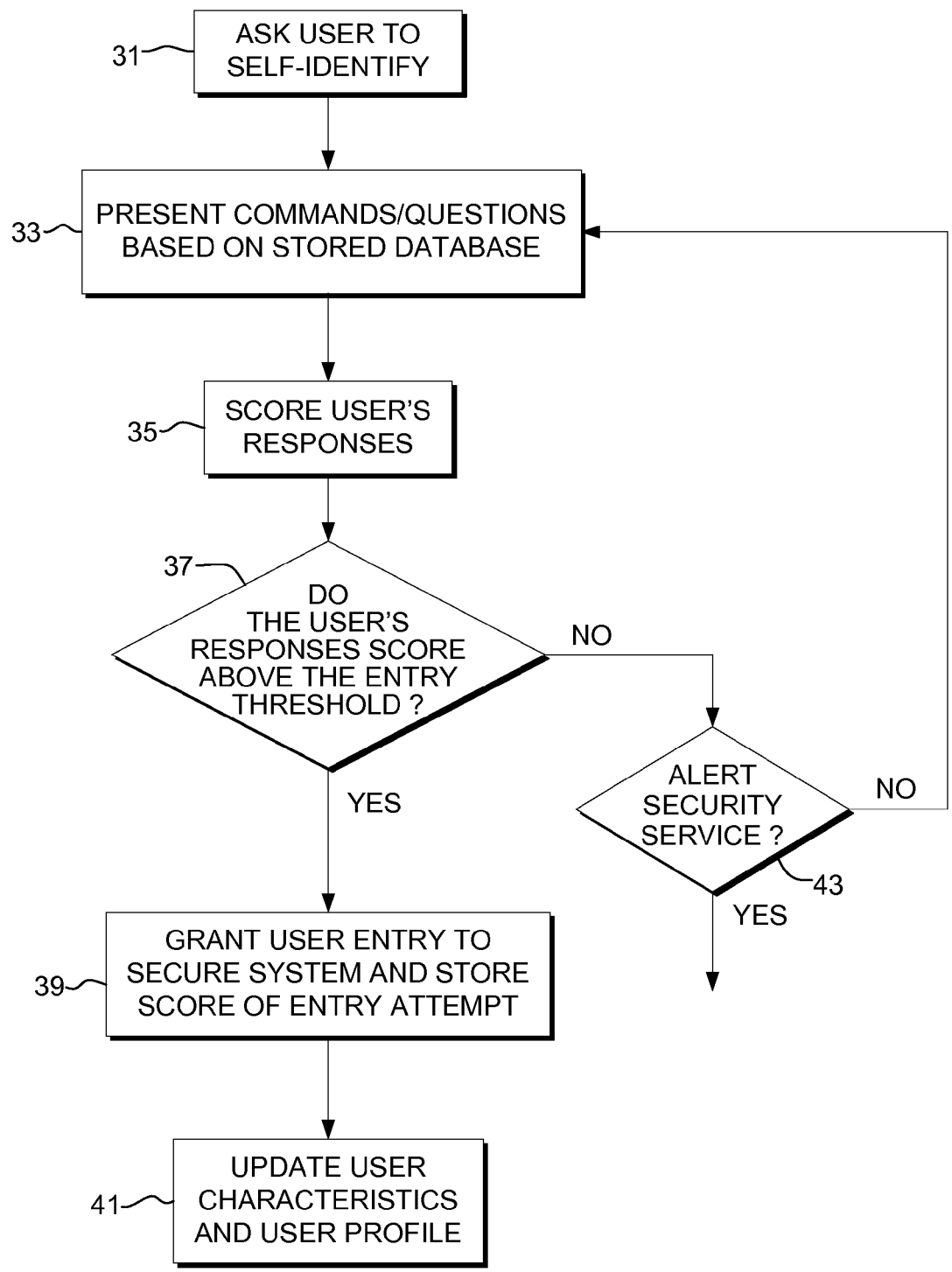
FIG. 3 is a flow chart diagram depicting the overall operation of controlling access, in accordance with an implementation of the invention.

FIG. 3 shows a flow chart diagram depicting the overall flow of the process, in accordance with the present invention. The user is initially required to identify themselves, as shown by block 31. This may be done by name or account number, for example. The divulgation of such information at this point in the process is harmless. After identifying the user's personal characteristic information corresponding to the user's initial identity, the system generates command/questions, i.e. statements, as shown by block 33. At this point, the system statement may be no more than a directive, such as, "tell me more about yourself".

In response to the system statement, the user responds with a statement that indicates some knowledge of the user characteristics stored in the system. The user's response is evaluated and scored, as represented by block 35. It is understood that the system statement and user response statement involves a back and forth process until the user's responses score above some predetermined entry threshold. This is represented by the query of block 37. If the threshold is met, entry is granted, as represented by block 39, and the user's personal characteristics and profile is updated, as shown by block 41.

Alternatively, if the threshold is not met, the process has two options, as represented by block 43. If a predetermined number of system statements have already been sent with no threshold reached, security service may be alerted, as represented by block 43. However, if the predetermined number of system statements has not been reached, as determined by block 43, the system may generate a further statement, as shown by the feedback loop from block 43 to block 33. Alternatively, security service may be alerted and a further statement to the user also sent.

Figure 4A:
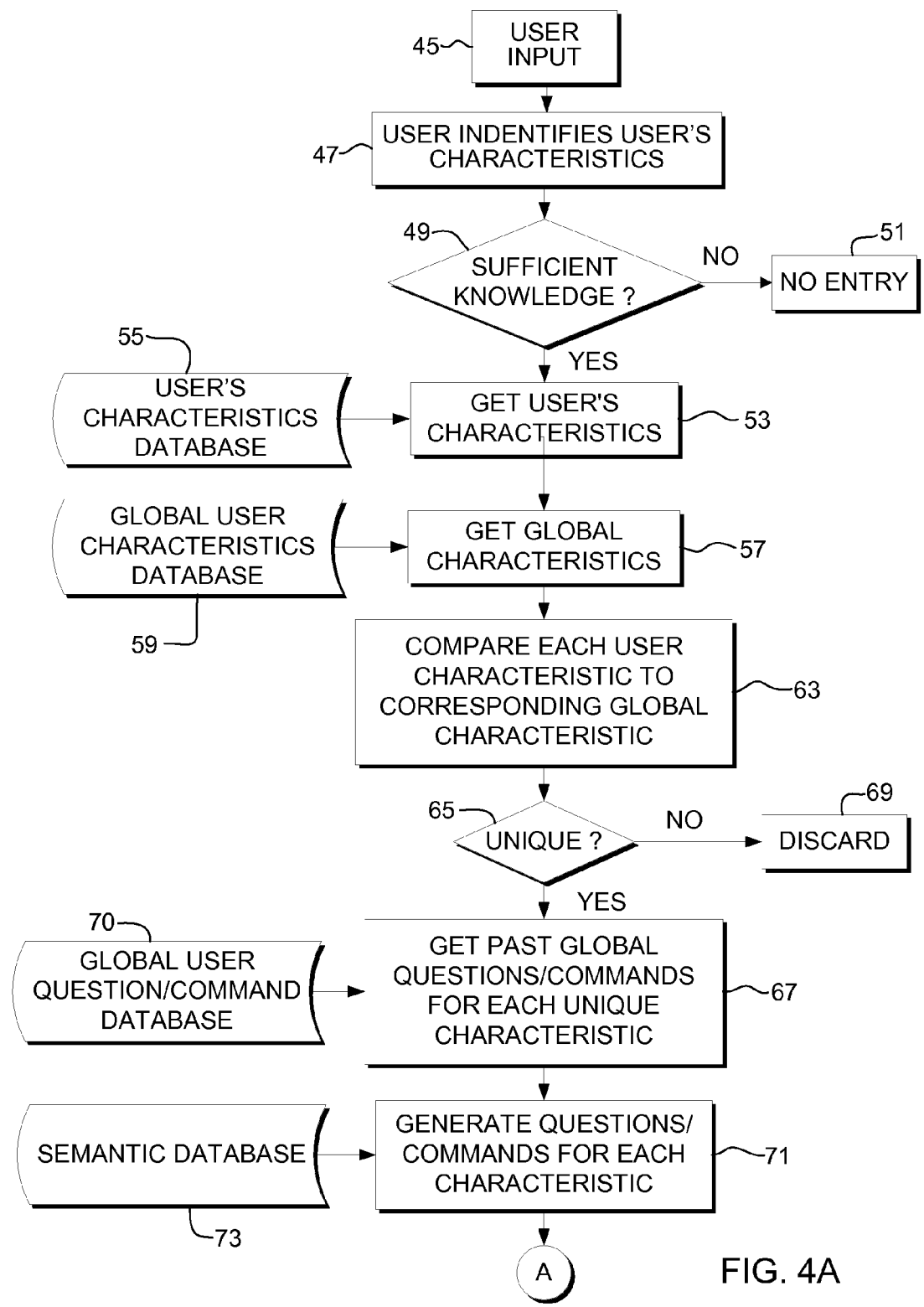
FIGS. 4A and 4B show a flow chart diagram of the process for identifying a user, in accordance with one implementation of the present invention.
Figure 4B:
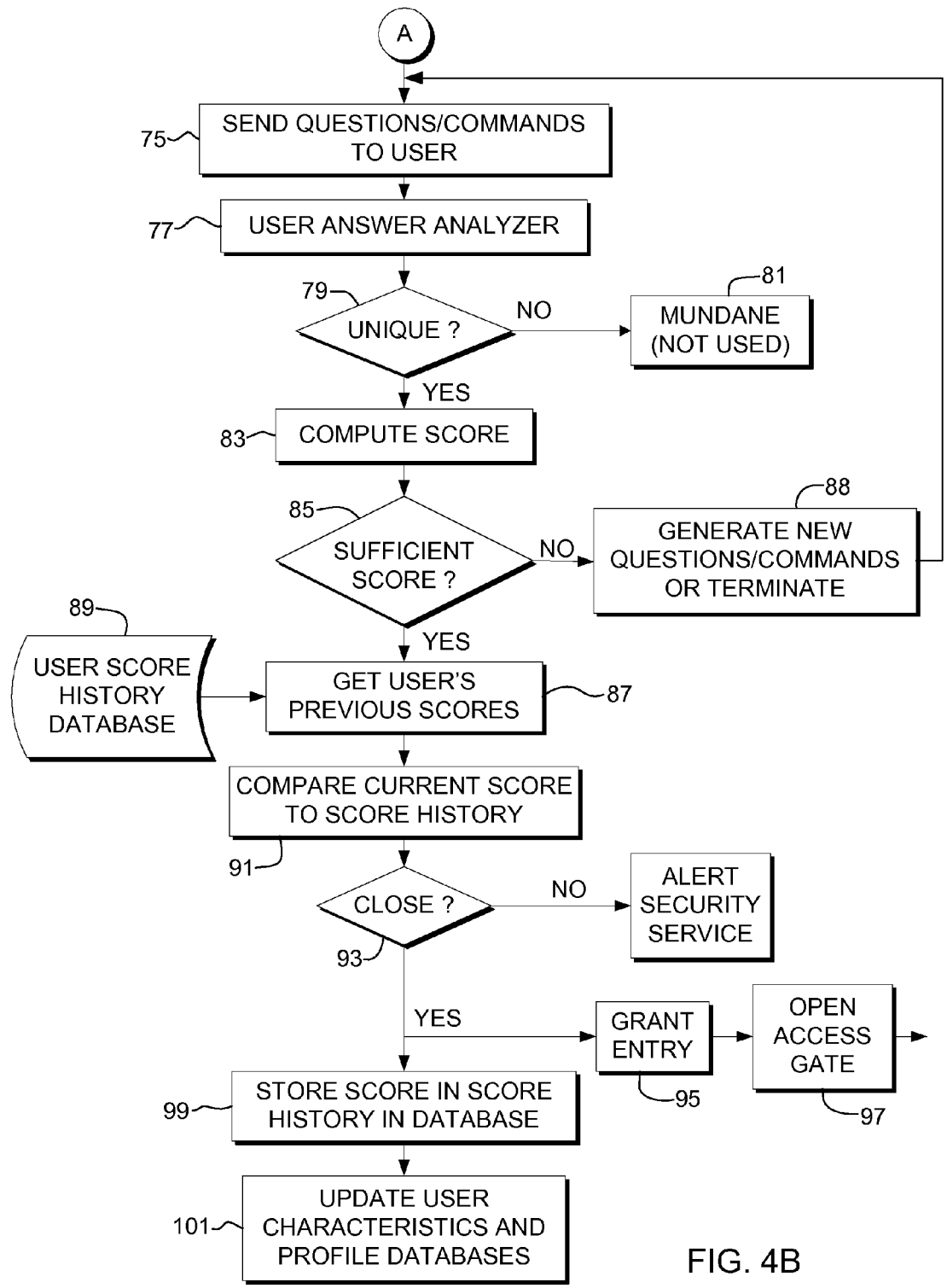

FIGS. 4A and 4B show a more detailed flow chart diagram of the process for identifying a user, in accordance with an implementation of the present invention. As described in regard to FIG. 3, the user initially self-identifies, as shown in block 45, by some conventional manner, such as, by account number, name, password, etc. This may be followed by the user identifying, in obscure terms, some aspect of the user's personal characteristics information stored in the system, so as to tap into the user's stored characteristics. This latter step is represented by block 47 and may be done in addition to the step described with respect to block 45 or in place of this step. Alternatively, step 47 may be removed. If removed, the system would then generate a statement asking the user to "tell the system something about yourself" so that a user response taps into the personal characteristics database.

The basic requirement, at this point, is for the user to demonstrate minimal sufficient knowledge of the user account to enter the process of having the user demonstrate, in response to system statements, extensive knowledge of the unique personal characteristics of the user stored in the system. This decision as to this minimal knowledge, is represented by block 49. If the user fails to provide minimal knowledge, there is no entry into the process, as shown at block 51.

If, on the other hand, the user provides minimal knowledge to enter the process, the next step in the process is to retrieve the user's personal characteristics file from the user's characteristics database, as shown by blocks 53 and 55. After retrieving the user's personal characteristics file, the process continues by retrieving the global user characteristics database, as shown by blocks 57 and 59.

The global user characteristics database stores classes of characteristics that are general or global, i.e. exist for a broad cross-section of users. For example, under the characteristic "places lived", a large number of users would live in New York City but for a specific user who lives in Timbuktu, the users "places lived" would be categorized as unique.

Figure 5:
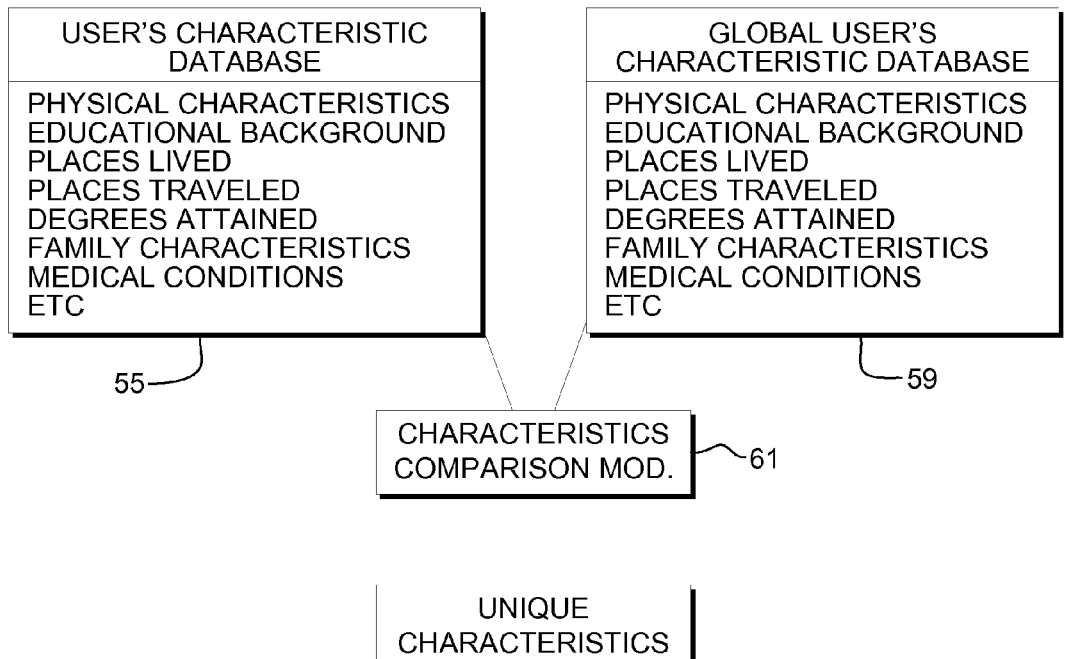
FIG. 5 shows a flow chart diagram example of possible user characteristics for determination of uniqueness, in accordance with one implementation of the process.

FIG. 5 shows a block diagram providing examples in blocks 55 and 59 of personal characteristics for user's database and global user characteristic database. Comparison module 61 acts to compare the particular user's characteristic identified with a corresponding global characteristic. This is shown by the corresponding comparison step 63 and decision step 65 in FIG. 4A. If it determined that the particular characteristic is unique, as shown by decision block 65 in FIG. 4A, the process continues with this particular characteristic to the step of block 67. If it is determined that the particular characteristic is not unique, it is discarded, as represented by block 69.

With reference again to FIG. 4A, in the step represented by block 67, past global questions or commands are retrieved from global user question/command database 70. The global user question/command database stores past questions/commands presented to user specific to a unique characteristic. This is done by questions/commands generator 71 in conjunction with semantic database 73. Because the questions/commands generated by questions/commands generator 71 are general, they can be re-used. By way of example, if a user has presented statements indicating that the user has a unique facial feature, the global user's characteristics database is used to produce a command "tell me something about your face".

As shown by the step of block 75 in FIG. 4B, the question/commands statements generated by the step of block 71 are sent to the user, as each of the various unique characteristic of the user may be considered during the process. Thus, the questions/commands statements are addressed sequentially and user answer analyzer 77 analyzes the respective responses statements to determine whether the information content of the answers is unique or mundane. This is carried out by the process decision step represented by block 79. This may be accomplished by analyzing key words and organization of the user's answers.

If the user answer is mundane, it is not used, as shown by block 81. If it is unique, the response is evaluated and scored, as shown in block 83 based, again, on key words and organization as compared to the stored personal characteristics stored in the system. In addition, the degree of uniqueness and the particularity of the user's response is used the scoring process.

Figure 6:
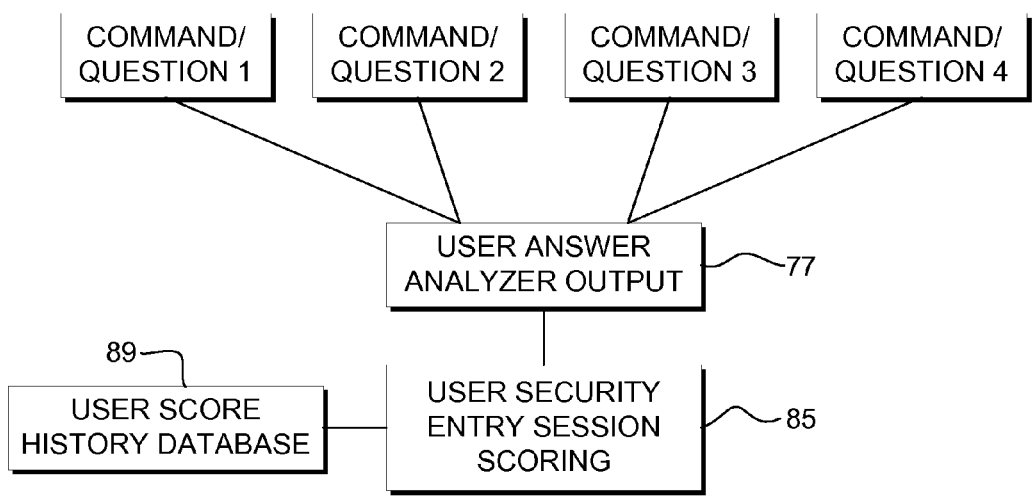
FIG. 6 shows a flow chart diagram example of possible Command/Question generation in accordance with one implementation.

FIG. 6 shows four, by way of example, command/question statements considered unique by user answer analyzer 77 in FIG. 4B. These four questions are considered sequentially by the user answer analyzer, not only because they are determined to be unique by the step of block 79, but also because they provide value for scoring. The cumulative score is sent to user security entry session scoring module 85.

In this regard, common questions dealing with identity and account information are considered low security scoring information. For example, the user's name, address, phone number, social security, etc. are data used to access many different accounts and is often publically available information, and therefore of little scoring value. Unique questions require highly personal information from the user and are often based on user's experiences. For example, unique facial features, hobbies, activities, and experiences are considered high security value scoring characteristics, depending upon how queried by the system and responded to by the user.

Thus, scoring value is assigned according to the type of question and answer. For example, the system can prompt the user, "you have a unique birthmark" and the user responds, "I have a star-shaped birthmark on my right knee" or the system can prompt, "where is your unique birthmark?" and then the user provides the correct response. Or, alternatively, the system can ask, "do you have something unique on your knee?" The user says "yes" if he has a birthmark there. This latter is an example of a vague question, the answer to which does not disclose vital information about the user. In this case, the probability of a random correct answer is one-half, and the scoring value is low. A decrease in the probability of a random correct answer can be obtained if the system asks the user the following, "tell me what unique characteristics you have". The user can respond "I have some unique feature on my right knee". In this case, the probability for a correct random answer is low and the answer does not provide much real information about the user. This type of question/answer has a high score value. Thus, a correct response to a unique (high-security) question is given a higher score than a correct response to a generic (low-security) question. Scoring values can be assigned to particular question/answer statements, as determined to be appropriate. Such assignment is a matter of designed choice and will vary with the particular application, the details of which are not required for an understanding of the present invention.

Module 85 in FIG. 6 is represented by step 83 in FIG. 4B, which maintains the cumulative score of the session. The cumulative score is compared to a predetermined threshold score, as shown by block 85, to determine if the user has shown sufficient knowledge of the user's personal characteristics stored in the system to continue the process toward access. If this cumulative user score is not sufficient, then the process may loop back to create a new question/command or, alternatively, terminate, as shown by the alternative steps represented by block 88.

Thus, the step of block 88 involves a further decision as to whether to generate a new command/question or stop the process. This decision may be based upon how many iterations of command/questions have been sent to the user. The process has the capability at this point to terminate the dialog with the user if a predetermined number of command/questions have been sent or a predetermined time has elapsed, for example.

If the decision processed by the step of block 85 is that a sufficient score has been reached, the current user score is compared to the history score for this user. This is accomplished by the step represented by block 87. This step acts to retrieve the user score history from the score history database, represented by block 87, and compare the user current score with the user score history, as shown by the step of block 91. If the current score is close to the score history, as determined by the decision step represented by block 93, the process continues to the decision to grant entry at step 95 and open access gate, as shown by the step of block 97. The current score is also stored in the score history, as shown by the step represented by block 99, and the user characteristics and profile databases are updated at the step represented by block 101.

If in comparing the current score to score history, the comparison is not close, security service may be alerted. However, such step is optional. In addition to score history, the history of questions and responses thereto for each user may be stored. This, along with score history, provides some indication of the behavioral characteristics of the user. Marked deviations in these characteristics from those stored may also be used to deny access, which step would necessitate modifying the process to grant access after evaluating score history and question/response history.

It should be clear that various alternatives to the steps disclosed are clearly within the scope of the invention. Accordingly, the process may vary but the basic features of the invention involving testing the user's knowledge of the user's personal characteristics stored in the system and, when sufficient user knowledge has been demonstrated, granting user access to the secured database.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A computer method for authenticating a user to allow user access to secure information stored in a computer system using personal characteristics of the user, comprising the steps of:

receiving at the computer system a user information statement of a user from a computer system user input terminal device sufficient to initially identify the user so as to authorize initiation of the authentication process in said computer system;

initiating the beginning of the authentication process by receiving at said computer system from said user input terminal a user initiated and created statement self-identifying a general personal characteristic of the user related to a class of personal characteristics of the user stored in a user personal characteristics database in said computer system with said user-initiated and created statement used by said computer system to begin the authentication dialog;

computer system generation of a list of user personal characteristics from the user identified class of personal characteristics of the user stored in the user personal characteristics database in said computer system in response to the user initiated and created statement self-identifying the personal characteristic;

further computer system generation of another list of general global user personal characteristic statements stored in a global user personal characteristics database stored in said computer system corresponding to said user identified class of user personal characteristics with said global user personal characteristic statements applicable to a broad cross-section of users and with said list including one list of general global user personal characteristic statements related to the personal characteristics of the user identified class of stored personal characteristics of the user with said statements generated to be used to elicit user created response statements from the user and another list of a collection of various user responses to each of the general global user personal characteristic statements of said one list;

sending to the user a general global user personal characteristic statement from said one list to elicit a user created response statement regarding corresponding personal characteristics in the generated list of user personal characteristics for the user identified class of user characteristics;

receipt of a user created response statement to the general global user personal characteristic statement sent to the user;

computer system comparison of the user created response statement created by the user to the general global personal statement sent to the user with the corresponding responses to the generated list of a collection of various user responses to the corresponding general global statement to determine if the user created response statement is unique as compared to the collection of various user responses;

where the created response statement is unique, sending successive further general global user personal characteristic statements from said one list each time a further statement sent to the user elicits further user created response statements that are unique as compared to the corresponding statements of the generated list of a collection of various user responses to the corresponding global statements;

computer system analysis of each of the respective further user created response statements to the successive further global general statements sent to the user as compared to the corresponding stored personal characteristics for the user selected class of user personal characteristics stored in the computer system database to further determine if each of the user created response statements is unique with said analysis based upon the key words and organization used in the response statements;

where the computer system analysis concludes that the user created response statements are unique, compute generation of a score based upon the degree of uniqueness and closeness of each of the response statements to the corresponding stored personal characteristic using key words and organization to create a cumulative score;

computer comparison of the cumulative score to a predetermined threshold score; and where the cumulative score fails to reach the predetermined threshold score condition, such failure of condition acts to initiate sending another of said sending successive further general global user personal characteristic statements from said one list.

2. The computer method for authenticating a user to allow user access to secure information stored in the computer system of claim 1 the user initiated and created statement, the user created response statement and the global user personal characteristic statement sent to the user are interactive and oral.

3. The computer method for authenticating a user to allow user access to secure information stored in the computer system of claim 2 further comprising the steps of comparing the cumulative score when the score reaches a predetermined threshold to a stored cumulative score history and granting user access to secure information stored in the computer system when the cumulative score is sufficiently close to the stored cumulative score history.

4. The computer method for authenticating a user to allow access to secure information stored in the computer system of claim 3 further comprising the step of terminating the sending to the user global user personal characteristic statements from said one list when a predetermined number statements have been sent and the cumulative score has not reached the predetermined threshold score.

* * * * *